United States Patent [19]

Black et al.

[11] 4,335,934
[45] Jun. 22, 1982

[54] SINGLE MODE FIBRE AND METHOD OF MAKING

[75] Inventors: Philip W. Black, Bishop's Stortford; John Irven, Stansted, both of England

[73] Assignee: International Standard Electric Corporation, New York, N.Y.

[21] Appl. No.: 201,943

[22] Filed: Oct. 29, 1980

[30] Foreign Application Priority Data

Oct. 29, 1979 [GB] United Kingdom ............... 7937402

[51] Int. Cl.³ ..................... G02B 5/172; C03B 37/075
[52] U.S. Cl. .................................. 350/96.33; 65/3.12; 350/96.34; 427/163
[58] Field of Search ................. 65/3.12; 427/163; 350/96.33, 96.34

[56] References Cited

U.S. PATENT DOCUMENTS

| | | | |
|---|---|---|---|
| 4,009,014 | 2/1977 | Black et al. | 65/3.12 |
| 4,045,198 | 8/1977 | Rau et al. | 65/3.12 |
| 4,106,850 | 8/1978 | Marcatili | 350/96.34 X |

FOREIGN PATENT DOCUMENTS 1029993  4/1978  Canada .
2627821  3/1977  Fed. Rep. of Germany ....... 65/3.12

OTHER PUBLICATIONS

Ainslie et al.; "Preparation of Long Lengths Of Ultra-Low-Loss Single Mode Fiber"; Electronic Letters, vol. 15, No. 14, Jul. 5, 1979; pp. 411-413.

*Primary Examiner*—Richard V. Fisher
*Attorney, Agent, or Firm*—John T. O'Halloran

[57] ABSTRACT

Single mode optical fibre for operation in the wavelength range 1.5 to 1.7 microns is made by depositing a cladding glass layer and then a core glass layer upon the bore of a silica substrate tube. The bore of the coated tube is then collapsed to form a solid cross-section optical fibre preform. The cladding glass has an index matching that of silica and either contains no oxide of phosphorus or the minimal amount to provide a low enough deposition temperature and high enough deposition rate to provide an acceptably low diffusion of hydroxyl groups from the material of the substrate tube. Optionally the deposition of the cladding may be preceded by the deposition of a diffusion barrier layer which may contain a higher proportion of oxide of phosphorus.

10 Claims, 8 Drawing Figures

SINGLE MODE FIBRE AND METHOD OF MAKING

FIELD OF THE INVENTION

This invention relates to the manufacture of optical fibre preforms and optical fibres, and is concerned particularly with the manufacture of single mode optical fibres capable of operation in the free-space wavelength range 1.5 to 1.7 microns.

According to the present invention there is provided a method of making an optical fibre preform wherein a layer of doped silica cladding glass having a refractive index not exceeding that of silica is deposited by vapour reaction directly upon the bore of a silica substrate tube or upon a doped silica diffusion barrier layer having a refractive index not less than that of the cladding glass that has been deposited by vapour reaction upon the bore of the silica substrate tube, wherein a higher refractive index layer of germania doped silica core glass is deposited by vapour reaction upon the cladding glass layer, wherein each of said vapour reactions is a reaction from which hydrogen and its compounds are excluded, wherein the cladding glass is silica doped with fluorine, and contains at least 0.5 mole % germania but not more than 0.5 mole % oxide of phosphorus, and wherein the bore of the thus coated tube is collapsed to form a solid cross-section optical fibre preform, and the relative amounts and compositions of the core and cladding glasses deposited are such that single mode optical fibre is capable of being drawn from the preform that is capable of single mode operation at selected wavelengths in the free-space wavelength range of 1.5 to 1.7 microns in which substantially all the optical power associated with the evanescent field of said single mode propagates in said cladding glass.

There follows a description of the manufacture of single mode optical fibres embodying the invention in preferred forms. This description is prefaced with an explanation of the background to the invention.

BRIEF DESCRIPTION OF THE DRAWINGS

In the description and explanation reference is made to the accompanying drawings, in which.

DETAILED DESCRIPTION OF THE INVENTION

One of the particular advantages of using silica as a material from which to manufacture optical fibre is that it can be made by vapour reaction process in a manner that permits close control of the amounts of any other materials incorporated into the material with the silica. In one method of manufacture, materials to form the cladding glass and the core glass are deposited by vapour reaction upon the bore of a silica substrate tube which is then collapsed to form a solid cross-section optical fibre preform from which optical fibre can subsequently be drawn. One of the important factors affecting the optical transmission of fibres produced by this method is the level of contamination by hydroxyl groups. Such groups may become directly incorporated into the deposited material if water is one of the reaction products of the vapour reaction used for deposition. This source of contamination can be avoided by choosing a vapour reaction from which hydrogen and its compounds are excluded. One class of suitable reactions involves the direct oxidation of halides or oxyhalides with oxygen. For this purpose the reagents may be entrained in oxygen and caused to flow down the substrate tube. The reaction does not proceed at room temperature, but may be promoted in the localised region of a short high temperature zone provided, for instance, by an oxyhydrogen flame. This zone is slowly traversed along the tube so as to build up a uniform thickness of clear glassy deposit along its length.

The material of the substrate tube is liable to be quite heavily contaminated with hydroxyl groups, and therefore it is general practice to deposit a layer of cladding glass before depositing the core glass. This is because, even in multimode fibre, a not entirely insignificant amount of optical power propagates in the evanescent field surrounding the optical core. Even when a vapour reaction from which hydrogen and its compounds are excluded is used to deposit the cladding glass, it is still possible for the deposited material to contain a certain concentration of hydroxyl groups. This is derived by diffusion from the material of the substrate tube. The amount of such diffusion can be reduced by choosing a relatively fast deposition reaction which proceeds at a relatively low temperature to produce a clear fused deposit. Thus, although undoped silica might be considered a good material to deposit to form the cladding, it is found that this has the disadvantage that direct oxidation of a silicon halide requires a relatively high deposition temperature to produce a clear fused deposit, and the reaction proceeds at a relatively slow rate. However, by co-depositing silica with one or more oxides of boron, phosphorus, and germanium, the deposition temperature necessary to produce a clear fused deposit is reduced and the deposition rate is increased.

Figure 1:
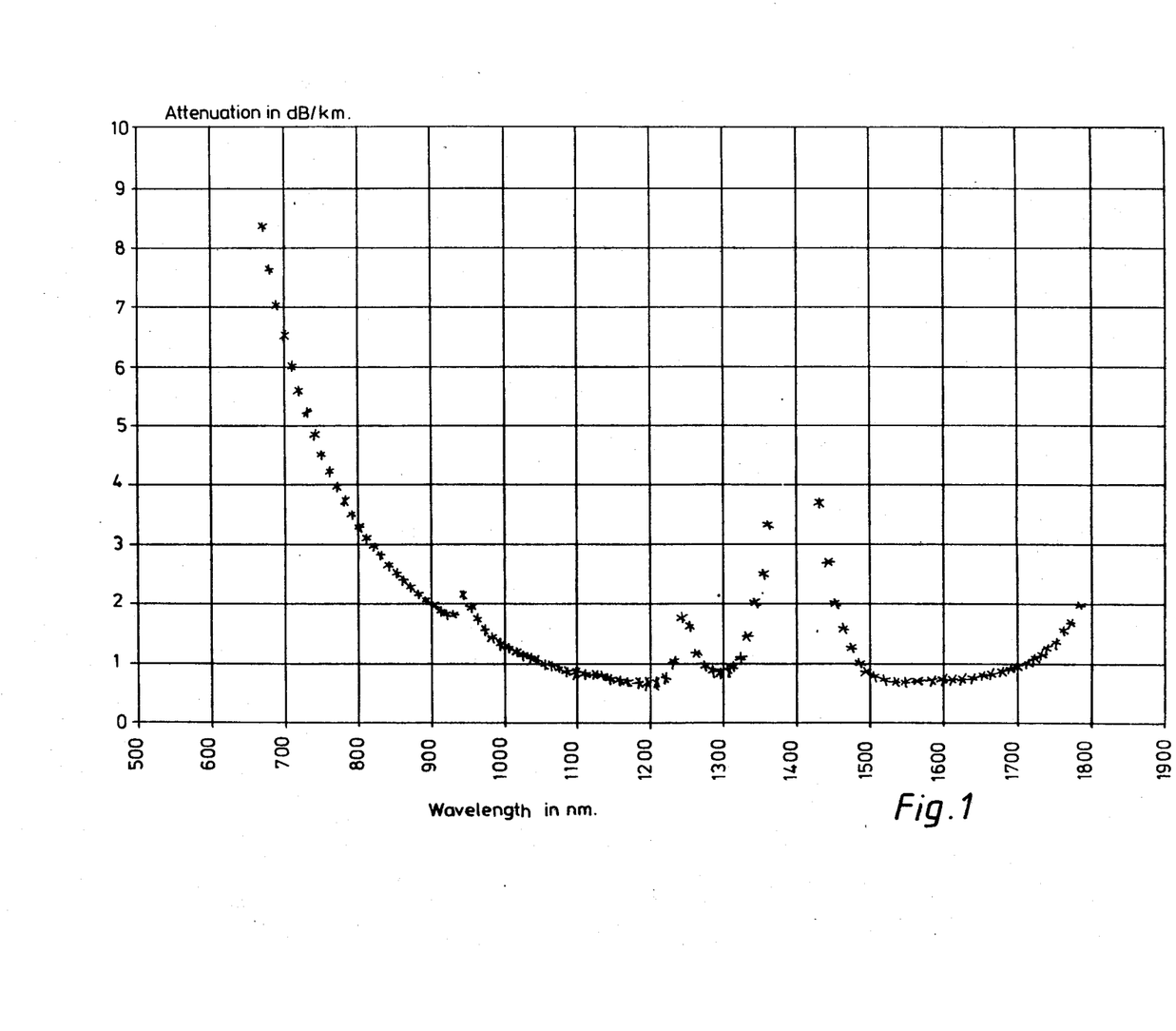
FIG. 1 is a graphic illustration of the spectral characteristic of a multimode graded index fibre.

Using this type of process it has been possible to produce multimode graded index fibre having the spectral characteristic depicted in FIG. 1. This fibre has a core of silica doped mainly with germania, but also including about 1 mole % oxide of phosphorus. The cladding is of silica doped with oxide of boron. FIG. 1 shows the characteristic rise in attenuation when proceeding to shorter wavelengths, that is attributable to Rayleigh scattering. Superimposed on this curve are hydroxyl group overtone peaks in the region of 0.95, 1.25 and 1.4 microns. At wavelengths beyond about 1.7 microns the attenuation begins to rise again; due to the absorption effects of silica and the dopants. The fundamental vibrational absorptions of B-O, P-O, Si-O and Ge-O are at 7.3, 8.0, 9.0 and 11.0 microns respectively, with absorption tails extending into the 1.0–2.0 micron region.

Figure 2:
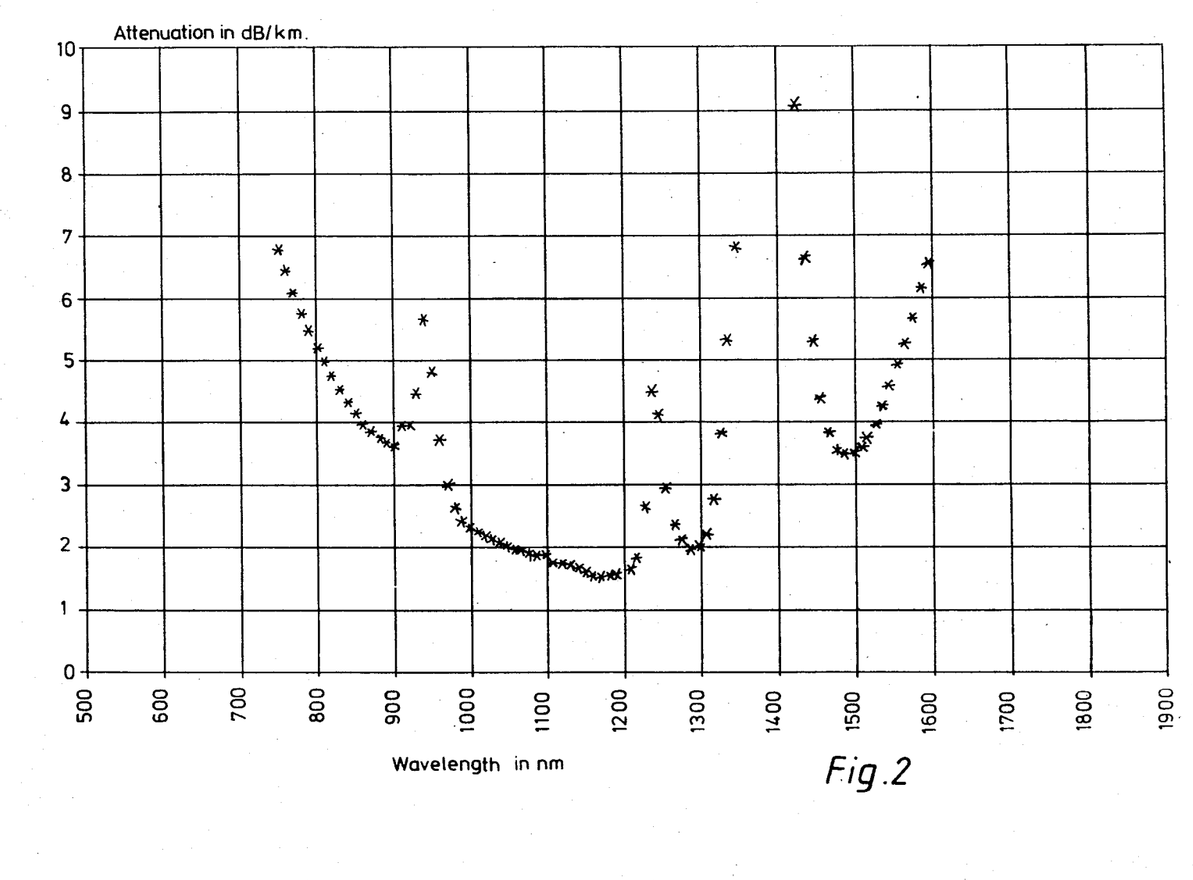
FIG. 2 is a graphic illustration of the spectral characteristic of a single mode fibre.

By way of contrast, the spectral characteristic of a single mode fibre is depicted in FIG. 2. This fibre has a germania doped silica core, and, like the single mode fibre described by B. J. Ainslie et al in *Electronics Letters* 5th July 1979, Volume 15, No. 14, pp. 411–3, uses silica doped with oxides of boron and phosphorus to produce a cladding glass having a refractive index matched with silica. A cladding glass with an index higher than that of the substrate tube would be undesirable because such a structure would guide cladding modes (modes guided by the interface between the cladding and the substrate) in addition to the desired single core mode. Therefore oxide of phosphorus should not be used as a sole dopant for the cladding, but by including oxide of phosphorus in the cladding layer it is possible to use less oxide of boron, while still maintaining a relatively fast deposition rate and low reaction temperature. A comparison of the spectral characteristics of FIGS. 1 and 2 shows that single mode fibre is not of such good quality, insofar as the attenuation is generally higher, and the hydroxyl group absorption peaks are higher. Another feature which is of particular importance in the design of a single mode fibre to operate in the window beyond the 1.4 micron peak is that this window has been significantly narrowed by the more pronounced effect of the tails of the B-O and P-O absorption peaks at longer wavelengths. The effect of these tails is more pronounced than in the case of the graded index multimode fibre because, in a single mode fibre, more of the optical power is propagating in the cladding.

The relative positions of their absorption bands means that oxide of boron is more harmful to long-wavelength operation than oxide of phosphorus, and so the former is excluded completely from both core and cladding while the latter is similarly excluded from the core since there the energy density is greater and thus absorption more significant. Superficially it might appear desirable therefore the long wavelength operation to choose a cladding glass composition in which fluorine is used instead of oxide of boron as the index reducing component of the dopant, and in which germania is used instead of oxide of phosphorus as the index increasing dopant. The matter is however complicated by the fact that oxide of boron tends to increase the rate of deposition, while fluorine tends to reduce it. Therefore it is desirable to keep the proportion of fluorine relative small. The requirement is to use no oxide of boron together with the requirement to minimise the use of fluorine. This in turn limits the amount of germania that can be used without producing an index exceeding that of silica. Therefore a rather high temperature of deposition is required to produce a fully fused clear glassy deposit. This is liable to produce larger hydroxyl absorption effects due to the increased diffusion of hydroxyl groups into the deposited cladding glass from the material of the substrate tube. Thus in some circumstances it can be advantageous to retain a residual amount of oxide of phosphorus in the composition so that the increased absorption that the phosphorus produces is more than offset by the reduction in absorption occasioned by being able to use a lower deposition reaction temperature in order to reduce hydroxyl group diffusion. The retention of a small part of the oxide of phosphorus is helpful in reducing the minimum deposition temperature, partly because it provides a greater reduction on a mole % basis, and partly because this increase in refractive index that it produces is smaller on a mole % basis, and hence about twice as much oxide of phosphorus is required to replace any given mole % of germania for which it is substituted.

Since it depends upon so many factors, the optimum amount of oxide of phosphorus to be included in the optical cladding will vary from application to application. Not least among these factors is the particular wavelength of operation for which the fibre is intended, and the degree of hydroxyl group contamination present in the material of the substrate tube. If the fibre is intended for operation close to the long wavelength end of the window, and if the contamination of the substrate material is relatively light, the optimum composition will contain little or no oxide of phosphorus, whereas if the converse is true, the concentration will be increased.

Figure 3:
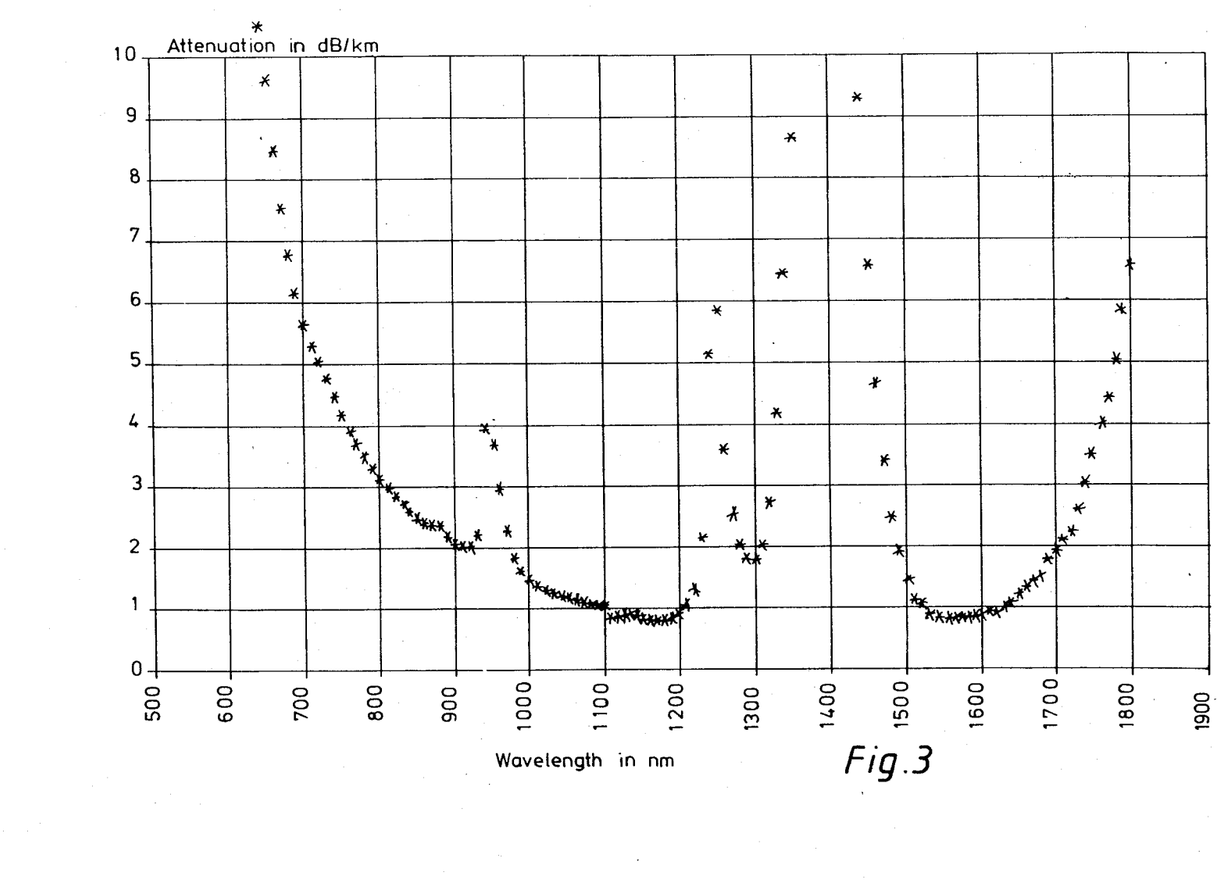
FIG. 3 is a graphic illustration of the spectral characteristic of a multimode step index fibre having a core of germania doped silica.
Figure 4:
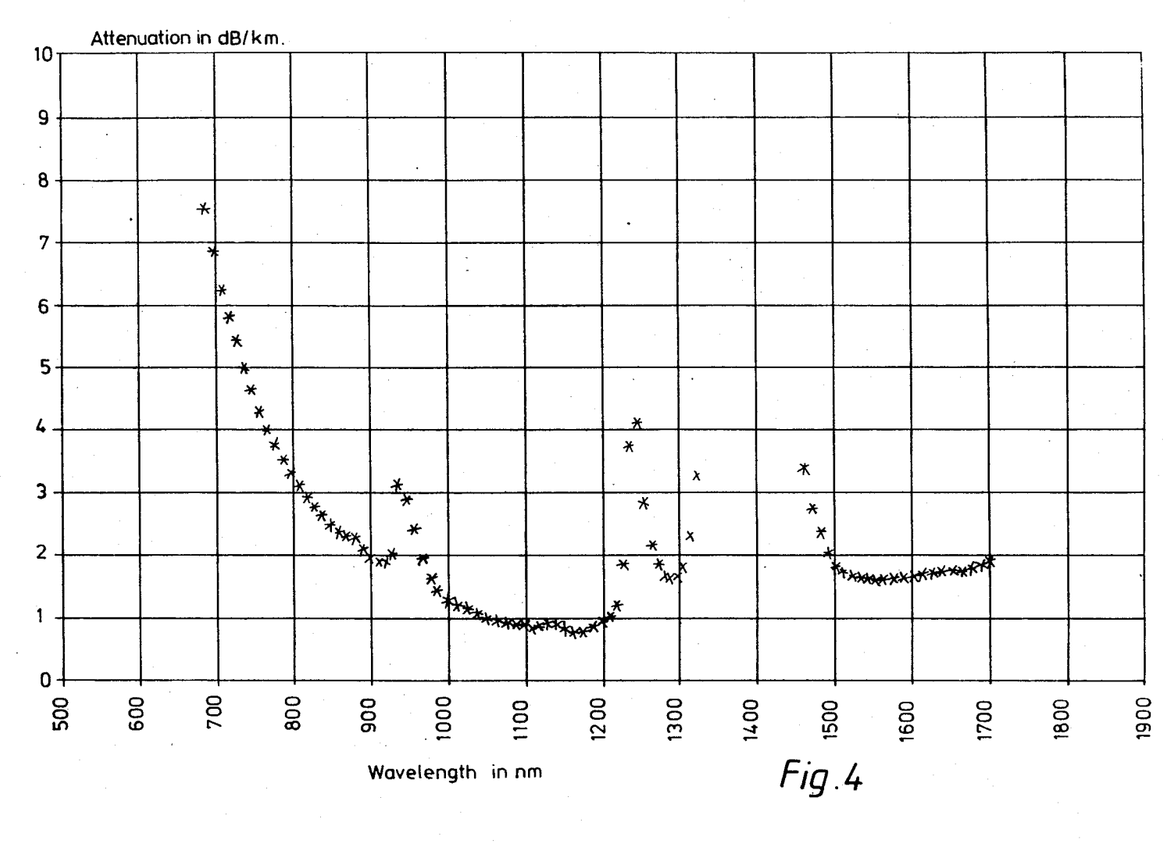
FIG. 4 is a graphic illustration of the spectral characteristic of an optical fibre whose core is doped with oxides of phosphorus and germanium.

A further factor to take into account is the fact that the absorption effects of hydroxyl group contamination seems to be more severe in the presence of oxide of phosphorus than in the presence of germania. This can be seen from a comparison of the spectral characteristics of two fibres depicted respectively in FIGS. 3 and 4. The fibre of FIG. 3 is a multimode step index fibre having a core of germania doped silica, while the fibre of FIG. 4 has a silica core doped with oxides of both germania and phosphorus. At a wavelength of 1.55 microns the loss of the FIG. 4 fibre is 1.5 dP/km while that of the FIG. 3 fibre is only 0.8 dB/km, despite the fact that the hydroxyl concentration is lower in the FIG. 4 fibre, as is evidenced by the relative heights of the respective hydroxyl absorption peaks at 0.95 microns, and also those of the peaks at 1.25 microns.

Figure 5:
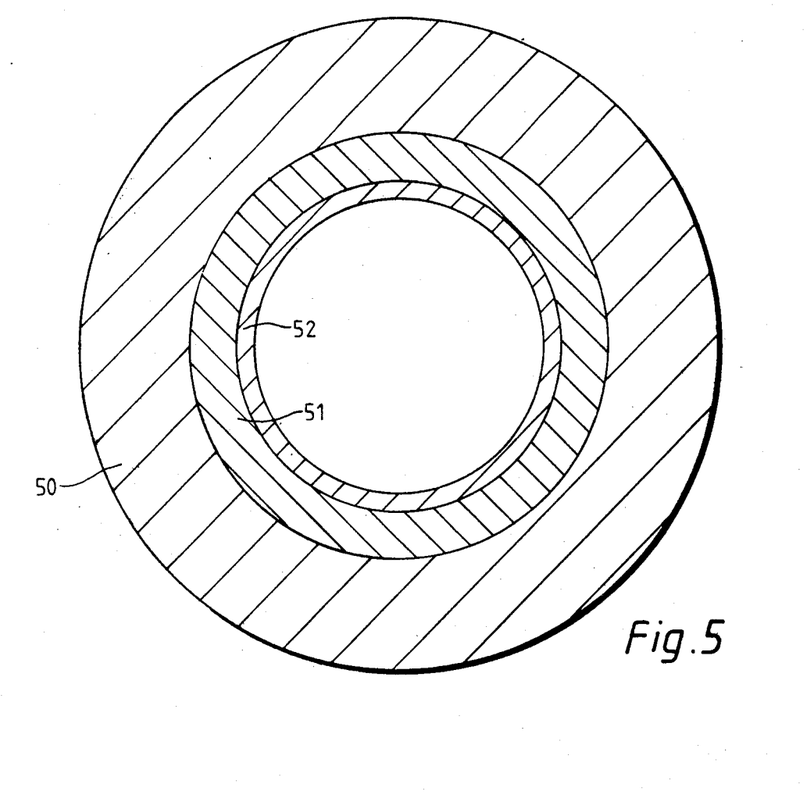
FIG. 5 depicts a cross-section of an internally coated substrate tube prior to collapse into an optical fibre preform.
Figure 6:
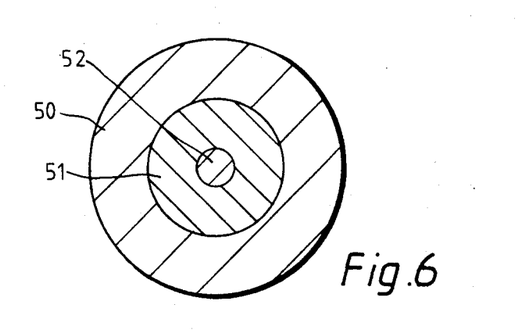
FIG. 6 depicts a cross-section of an optical fibre drawn from the preform of FIG. 5.
Figure 7:
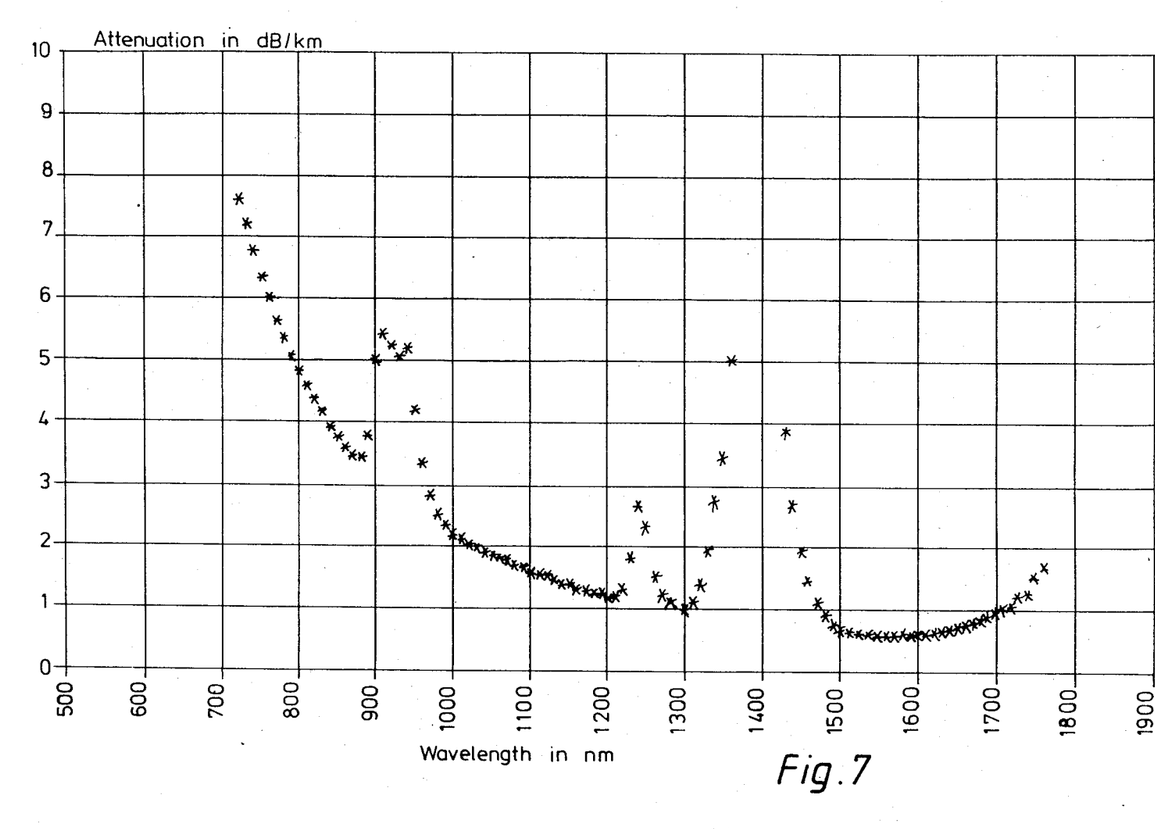
FIG. 7 is a graphic illustration of the spectral characteristic of the fibre of FIG. 6.

According to one example of the invention a 14 by 12 mm diameter silica tube 50 (FIG. 5) approximately one meter long was carefully cleaned, dried, and mounted in a special lathe having synchronously driven head- and tail-stocks. Oxygen was passed down the tube which was rotated about its axis while an oxyhydrogen flame was traversed along its length to ensure a clean dry flame-polished bore ready to receive a layer 51 of cladding glass. The cladding glass was deposited changing the gas flow to one consisting of 300 cc/min, 20 cc/min and 20 cc/min of oxygen carrier gas passed through silicon tetrachloride, germanium tetrachloride, and phosphorus oxychloride respectively, 20 cc/min of dichlorodifluoromethane, and 2000 cm/min of additional oxygen. After deposition of a relatively thick layer of this cladding, built up by a succession of traverses of the oxyhydrogen flame, the gas composition was changed a second time so as to deposit a core glass layer 52. For this the flow of oxygen carrier gas through the silicon tetrachloride was reduced to 50 cc/min, while that through the germanium tetrachloride was increased to 65 cc/min. The flow of carrier gas through the phosphorus oxychloride was halted, and also the flow of dichlorodifluoromethane was shut off, but the flow of additional oxygen was maintained at its original rate. These flow rates for the cladding glass deposition were found to give a glass having a refractive index matching that of silica composed of silica doped with about 1 mole % germania about 0.2 mole % oxide of phosphorus, and about 0.3 mole % fluorine. The flow rates for the core glass deposition produced a composition consisting of silica doped with about 6 mole % germania. Next the bore of the coated tube was collapsed to form a solid cross-section optical fibre preform. The collapse was effected by using a higher temperature flame to soften the wall of the tube so that it collapsed under the effects of surface tension. Several traverses of the flame were used to bring about complete collapse of the bore, and during the initial stages of the collapse, which was performed in the manner set out in U.S. Pat. No. 4,165,224 (J. Irven- A. P. Harrison 12-2), a flow of 2.5 cc/min was maintained through the germanium tetrachloride in order to compensate the loss by volatilisation of germania that would otherwise occur from the surface of the bore. A small excess pressure was maintained in the bore during the collapse to ensure circularity of the collapse. Next the preform was mounted in a pulling tower, and single mode fibre (FIG. 6) was drawn from it having a core diameter of 6.5 microns a cladding diameter of 45 microns, and an overall diameter of 125 microns. The spectral characteristic of the fibre is depicted in FIG. 7, and shows the fibre to have a loss of 0.57 dB/km at 1.57 microns.

In a modification of the above described process the deposition of the cladding glass if preceded by the deposition of a layer of glass to form a diffusion barrier to limit the diffusion of impurities, particularly hydroxyl groups, from the substrate tube into the cladding glass layer. This diffusion barrier layer can be made of an optically absorbing glass since it is situated beyond the region where there is significant power in the evanescent field of the single propagating mode of the fibre. This means that, by using an appreciable quantity of oxide of phosphorus, the diffusion barrier layer can be deposited at a fairly rapid rate using a relatively low deposition temperature so as to limit diffusion effects. Oxide of boron could also be used with a view to increasing the deposition rate, but it may be preferred not to do so, particularly where there is a risk of contamination of the optical cladding. Then, when the region is reached to which significant optical power is going to penetrate, the oxide of phosphorus can be entirely replaced with germania. This will require a higher deposition temperature, but the hydroxyl group diffusion effects are reduced because of the presence of the intervening barrier layer. The refractive index of the barrier layer is made not less than that of the cladding glass so as to avoid a structure which will support cladding modes guided by the interface between these two layers.

Figure 8:
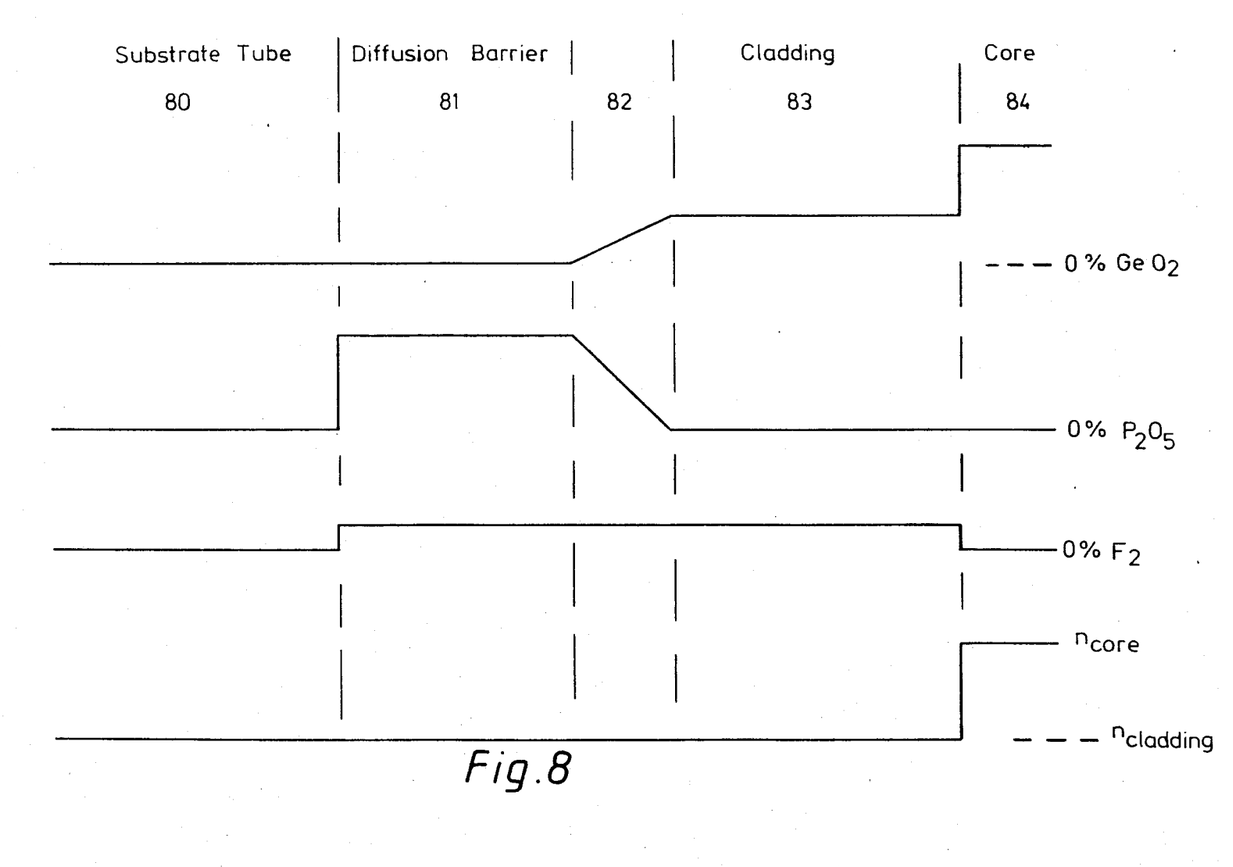
FIG. 8 is a diagram showing the compositional structure of a further optical fibre.

FIG. 8 shows another compositional structure. In this figure the material of the substrate is represented at 80, and that of the diffusion barrier layer at 81. At 82 there is a graded region where the composition changes over to the material of the cladding glass region 83. Finally, the core glass region is represented at 84. The diffusion barrier layer region 81 is provided by silica doped with oxide of phosphorus and fluorine in relative proportions to provide an index match with the silica of the tubular substrate 80. In the cladding glass layer, the oxide of phosphorus has been entirely replaced with germania in order to avoid absorption losses associated with the P-O bond. However, a residual amount could be retained to lower the deposition temperature. The amount of germania present in the cladding glass layer is selected to provide a refractive index matching that of silica. Finally the higher index material of the core glass layer 84 is deposited. In this instance this is provided by silica doped solely with germania, and the concentration of the germania is higher than that in the cladding glass layer. A graded compositional change between the material of the diffusion barrier and that of the cladding glass has been provided to take advantage of the fact that the power density in the evanescent mode does not terminate abruptly, but falls off with distance from the core. It is therefore possible to match the grading with the power density profile over the last portion of the range of that profile.

Maintaining the same level of fluorine doping in the regions 81, 82 and 83 is merely a convenience. However maintenance of substantially the same refractive index in the regions 81, 82 and 83 is necessary in order to prevent the guiding of optical modes by interfaces other than that between the core and the cladding. In region 81 doping with oxide of boron can replace some or all the doping with fluorine.

In the foregoing examples no fluorine has been employed in the formulation of the core glass. However fluorine can be included so as to enable a higher proportion of germania to be used to provide a given refractive index. This has the effect of changing the material dispersion of the fibre, and by this means it is possible to arrange for the material dispersion to be compensated by the waveguide dispersion.

In the foregoing description germania has been exemplified as the principal refractive index increasing dopant. This is because the fundamental vibrational absorption of the bond between oxygen and germanium lies at a longer wave-length than that of the bond between oxygen and silicon. It will therefore be apparent that a dopant can satisfactorily be substituted for germania provided that it is an oxide of an element similarly for which the fundamental vibrational absorption of the bond between oxygen and that element lies at a longer wavelength than that of the bond between oxygen and silicon.

We claim:

1. A method of making an optical fiber preform suitable for use in the manufacture of single mode optical fiber, comprising the steps of:
   despositing, by vapor reaction, on the bore of a silica substrate tube, a layer of fluorine doped silica cladding glass containing at least 0.5 mole % germania and having a refractive index not exceeding that of pure silica;
   depositing, by vapor reaction, on said layer of cladding glass, a layer of germania doped silica core glass; and,
   collapsing the bore of the tube to form a solid cross-section optical fiber preform.

2. A method as claimed in claim 1 wherein the cladding glass contains oxide of phosphorus in an amount not exceeding 0.5 mole %.

3. A method as claimed in claim 2 wherein a diffusion barrier layer is deposited on the substrate tube and then the cladding layer is deposited, said diffusion barrier layer having a higher mole percentage of oxide of phosphorus than is present in the subsequently deposited layer and cladding glass.

4. A method as claimed in claim 3 wherein the refractive index of the diffusion barrier layer matches that of the cladding glass.

5. A method as claimed in any one of claims 1, 2, 3, or 4 wherein the refractive index of the cladding glass matches that of pure silica.

6. A method as claimed in claim 3 or 4 wherein the germania doped silica core glass additionally includes fluorine as a dopant.

7. A method as claimed in claim 3 wherein the diffusion barrier layer includes a transitional region in which the composition is graded to the material of the cladding glass layer.

8. A solid cross-section optical fiber preform made by the method claimed in claim 1 or 3.

9. A single mode optical fiber drawn from a preform as claimed in claim 8.

10. A method of making an optical fiber preform suitable for use in the manufacture of single mode optical fiber, comprising the steps of:
  depositing on the bore of a silica substrate tube a diffusion barrier layer containing an oxide of phosphorus,
  depositing, by vapor reaction, on said diffusion barrier layer a layer of fluorine doped silica cladding glass containing at least 0.5 mole % of an oxide of an element for which the fundamental vibrational absorption of the bond between oxygen and that element lies at a longer wavelength that that of the bond between oxygen and silicon, and oxide of phorphorus in an amount not exceeding 0.5 mole %, the mole percent of said oxide of phosphorus in said diffusion barrier layer being higher than that of said cladding glass, said cladding glass having a refractive index not exceeding that of pure silica;
  depositing, by vapor reaction, on said layer of cladding glass, a layer of silica core glass containing an oxide of an element for which the fundamental vibrational absorption of the bond between oxygen and that element lies at a longer wavelength than that of the bond between oxygen and silicon; and
  collapsing the bore of the tube to form a solid cross-section optical fiber preform.

* * * * *